(No Model.)

N. LITTLE, Jr.
NUT LOCK.

No. 250,448.  Patented Dec. 6, 1881.

Attest;
Wm H. Drury.
Louis Cohen.

Inventor;
Nathaniel Little Jr.
per Edw. Dummer,
Atty.

N. PETERS, Photo-Lithographer, Washington, D. C.

UNITED STATES PATENT OFFICE.

NATHANIEL LITTLE, JR., OF NEWBURY, MASSACHUSETTS.

NUT-LOCK.

SPECIFICATION forming part of Letters Patent No. 250,448, dated December 6, 1881.

Application filed August 22, 1881. (No model.)

*To all whom it may concern:*

Be it known that I, NATHANIEL LITTLE, Jr., a citizen of the United States, residing at Newbury, in the county of Essex and State of Massachusetts, have invented a new and useful Improvement in Nut-Locks, of which the following is a specification, reference being had to the accompanying drawings.

My invention relates to a device for keeping a nut in place on a screw or bolt; and it consists in a pin driven in a hole in the side of a nut and against or into the screw or bolt with sufficient force or a sufficient distance to prevent the nut from being accidentally turned, the nut being riveted—that is, hammered down—about the hole over the pin to prevent the pin from working out.

Figure 2:
Figure 1:
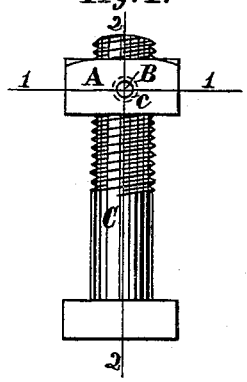
Figure 3:
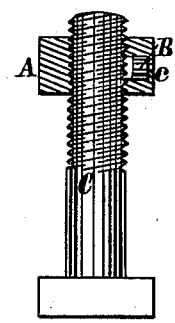
Figure 4:
Figure 5:

In the drawings, Figure 1 shows a bolt and nut having my device. Fig. 2 is a section of nut and bolt, taken on line 1 1 in Fig. 1. Fig. 3 shows a section of the nut, taken on line 2 2 in Fig. 1; and Figs. 4 and 5 show different forms of the pin.

The nut A has a hole through one side, into which is driven a pin, B, so that the outer end of the pin is a little farther toward the bolt C than the outer surface of the side of the nut. The pin B may be varied in shape, having the hole in the nut to correspond; but I prefer a round pin sharpened at the inner end by being beveled on two sides, *a a*, as shown in Fig. 4, or on one side, *b*, as shown in Fig. 5. The pin is driven with some force against, and by preference a slight distance into, the threads of the bolt. The nut is then riveted—that is, hammered down—about the hole at *c* over the end of the pin, by which operation the hole at the outer end is made smaller than that part occupied by the pin, so that the pin cannot work out. The pin so driven in and held effectually prevents the nut from being accidentally displaced, and yet in such a manner that the nut may be removed, when required, by a force applied to turn it greater than would be likely to act upon it accidentally, but such as may be readily applied. The riveted part of the nut about the hole at *c* may, however, be cut out, if needed, for more easily removing the pin and nut.

I claim as my invention—

The method set forth of locking nuts upon bolts or screws by first driving a pin of suitable length, and sharpened at one end, as specified, into a hole in the side of the nut tight against the bolt or screw, or so that the point may enter a slight distance into the thread thereof, then securing said pin in place by hammering the metal of the nut around the pin-hole to close over the head of the pin.

NATHANIEL LITTLE, JR.

Witnesses:
HALE KNIGHT,
HEBER LITTLE.